US011288692B2

(12) United States Patent
Saiki et al.

(10) Patent No.: US 11,288,692 B2
(45) Date of Patent: Mar. 29, 2022

(54) VEHICLE MANAGEMENT SYSTEM AND VEHICLE MANAGEMENT METHOD

(71) Applicant: HONDA MOTOR CO., LTD., Tokyo (JP)

(72) Inventors: Ryo Saiki, Wako (JP); Jumpei Ichinokawa, Wako (JP); Atsuyuki Suzuki, Wako (JP); Naoko Imai, Wako (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/124,856

(22) Filed: Dec. 17, 2020

(65) Prior Publication Data

US 2021/0192559 A1    Jun. 24, 2021

(30) Foreign Application Priority Data

Dec. 24, 2019  (JP) .............................. JP2019-232501

(51) Int. Cl.
*G06Q 30/00* (2012.01)
*G06Q 30/02* (2012.01)
*B60S 3/00* (2006.01)
*G06Q 30/06* (2012.01)
*G06K 9/00* (2022.01)
*B60S 5/00* (2006.01)

(52) U.S. Cl.
CPC .......... *G06Q 30/0208* (2013.01); *B60S 3/008* (2013.01); *B60S 5/00* (2013.01); *G06K 9/00832* (2013.01); *G06Q 30/0207* (2013.01); *G06Q 30/0645* (2013.01)

(58) Field of Classification Search
None
See application file for complete search history.

(56) References Cited

U.S. PATENT DOCUMENTS

| 2002/0107665 | A1* | 8/2002 | Tyson | A47L 15/46 702/183 |
| 2002/0165695 | A1* | 11/2002 | Tyson | A47L 15/0049 702/182 |
| 2011/0011422 | A1* | 1/2011 | Jeon | H05B 6/6405 134/18 |
| 2018/0330475 | A1* | 11/2018 | Tokatyan | G06K 9/00832 |
| 2019/0066249 | A1* | 2/2019 | Decaluwe | G06Q 50/30 |

(Continued)

FOREIGN PATENT DOCUMENTS

WO     2008/065870     6/2008

*Primary Examiner* — Luis A Brown
(74) *Attorney, Agent, or Firm* — Rankin, Hill & Clark LLP

(57) ABSTRACT

A vehicle management system includes a vehicle cabin interior information acquisition unit, acquiring vehicle cabin interior information indicating a situation in a vehicle cabin of a vehicle, a dirt factor element recognition unit recognizing a dirt factor element related to dirt in the vehicle cabin based on the vehicle cabin interior information acquired by the vehicle cabin interior information acquisition unit, and a vehicle cleaning handling unit transmitting vehicle cleaning information about cleaning of the vehicle to a user terminal or a maintenance management server when the dirt factor element recognition unit recognizes the dirt factor element, the user terminal being used by a user of the vehicle, the maintenance management server managing maintenance of the vehicle.

10 Claims, 6 Drawing Sheets

(56) References Cited

U.S. PATENT DOCUMENTS

| | | | |
|---|---|---|---|
| 2019/0187716 A1* | 6/2019 | Cantrell | G05D 1/0088 |
| 2019/0197325 A1* | 6/2019 | Reiley | G08B 21/24 |
| 2020/0175783 A1* | 6/2020 | Adams | G07C 5/0808 |
| 2020/0238953 A1* | 7/2020 | Spasovski | G06K 9/00791 |
| 2021/0003413 A1* | 1/2021 | Woo | G01C 21/3484 |
| 2021/0125322 A1* | 4/2021 | Ventimiglia | G06T 7/001 |

* cited by examiner

VEHICLE MANAGEMENT SYSTEM AND VEHICLE MANAGEMENT METHOD

INCORPORATION BY REFERENCE

The present application claims priority under 35 U.S.C. § 119 to Japanese Patent Application No. 2019-232501 filed on Dec. 24, 2019. The content of the application is incorporated herein by reference in its entirety.

BACKGROUND OF THE INVENTION

Field of the Invention

The present Invention relates to a vehicle management system and a vehicle management method.

Description of the Related Art

In related art, an air condition notification device has been suggested which detects a carbon dioxide concentration in a vehicle cabin by a gas sensor, causes an indicator lamp to be lit and a buzzer to sound when the carbon dioxide concentration in the vehicle cabin reaches a high level, and thereby notifies a state of air pollution in the vehicle cabin to an occupant (For example, see International Publication No. WO 2009/065870).

SUMMARY OF THE INVENTION

Technical Problem

The above vehicle management system in related art may detect that air pollution in a vehicle cabin progresses and notifies an occupant but may not cope with dirt in the vehicle cabin due to mud, spilled food, or the like. Further, when dirt in the vehicle cabin is left, user satisfaction particularly for a shared vehicle such as a vehicle for sharing may be lowered.

An object of the present invention, which has been made in consideration of such a background, is to provide a vehicle management system and a vehicle management method that may prevent dirt in a vehicle cabin from being left.

Solution to Problem

A first aspect for achieving the above object provides a vehicle management system including: a vehicle cabin interior information acquisition unit acquiring vehicle cabin Interior information indicating a situation in a vehicle cabin of a vehicle; a dirt factor element recognition unit recognizing a dirt factor element based on the vehicle cabin interior information acquired by the vehicle cabin interior information acquisition unit, the dirt factor element being an element serving as a possible factor of dirt in the vehicle cabin; and a vehicle cleaning handling unit transmitting vehicle cleaning information about cleaning of the vehicle to at least either one of a user terminal and a maintenance management server when the dirt factor element recognition unit recognizes the dirt factor element, the user terminal being used by a user of the vehicle, the maintenance management server managing maintenance of the vehicle.

The vehicle management system may be configured such that the vehicle cabin interior information acquisition unit acquires an image of a vehicle cabin interior as the vehicle cabin interior information, the image being photographed by a camera provided in the vehicle, and the dirt factor element recognition unit recognizes a situation in which an occupant of the vehicle contacts with food and drink in the vehicle cabin as the dirt factor element based on the image of the vehicle cabin interior, the image being acquired by the vehicle cabin interior information acquisition unit.

The vehicle management system may be configured such that the vehicle cabin interior information acquisition unit acquires an image of a vehicle cabin interior as the vehicle cabin interior information, the image being photographed by a camera provided in the vehicle, and the dirt factor element recognition unit recognizes a situation in which a child rides in the vehicle cabin as the dirt factor element based on the image of the vehicle cabin interior, the image being acquired by the vehicle cabin interior information acquisition unit.

The vehicle management, system may be configured such that the vehicle cabin interior information acquisition unit acquires an image of a vehicle cabin interior as the vehicle cabin interior information, the image being photographed by a camera provided in the vehicle, and the dirt factor element recognition unit recognizes, as the dirt factor element, a fact that a concordance rate between the image of the vehicle cabin interior, the image being photographed by the camera after use of the vehicle is finished and acquired by the vehicle cabin interior information acquisition unit, and a reference image of the vehicle cabin interior is a first predetermined value or smaller.

The vehicle management system may be configured such that the vehicle cabin interior information acquisition unit acquires an odor level in the vehicle cabin as the vehicle cabin interior information, the odor level being detected by an odor sensor provided in the vehicle, and the dirt factor element recognition unit recognizes, as the dirt factor element, a fact that the odor level acquired by the vehicle cabin interior information acquisition unit is a predetermined level or higher.

The vehicle management system may be configured such that the vehicle cabin interior information acquisition unit acquires a sound in the vehicle cabin as the vehicle cabin interior information, the sound being detected by a microphone provided in the vehicle, and the dirt factor element recognition unit recognizes, as the dirt factor element, a fact that a concordance rate between the sound in the vehicle cabin, the sound being acquired by the vehicle cabin interior information acquisition unit, and a predetermined monitoring target sound is a second predetermined value or greater.

The vehicle management system may be configured such that the vehicle cabin interior information acquisition unit acquires, as the vehicle cabin interior information, an image of a vehicle cabin interior, the image being photographed by a camera provided in the vehicle, and a sound in the vehicle cabin, the sound being detected by a microphone provided in the vehicle, and the dirt factor element recognition unit recognizes, as the dirt factor element, a fact that a situation in which an occupant of the vehicle contacts with food and drink in the vehicle cabin is recognized based on the image of the vehicle cabin interior, the image being acquired by the vehicle cabin interior information acquisition unit, and that a concordance rate between the sound in the vehicle cabin, the sound being acquired by the vehicle cabin interior information acquisition unit, and a predetermined monitoring target sound is a third predetermined value or greater.

The vehicle management system may be configured such that the vehicle cleaning handling unit transmits the vehicle cleaning information to at least either one of the user terminal and the maintenance management server when use of the vehicle is finished.

The vehicle management system may be configured such that the vehicle is a rented vehicle and such that the vehicle management system further includes a first renting fee discounting unit executing a first renting fee discounting process of discounting a renting fee of the vehicle in a case where the dirt factor element recognition unit does not recognize the dirt factor element when the vehicle is returned.

The vehicle management system may be configured such that the vehicle is a rented vehicle and such that the vehicle management system further includes: a vehicle cabin interior cleaning estimation unit estimating that a vehicle cabin interior is cleaned based on the vehicle cabin interior information acquired by the vehicle cabin interior information acquisition unit; and a second renting fee discounting unit executing a second renting fee discounting process of discounting a renting fee of the vehicle in a case where the vehicle cleaning handling unit transmits the vehicle cleaning information to the user terminal when the vehicle is returned and where the vehicle cabin interior cleaning estimation unit estimates that the vehicle cabin interior is cleaned based on the vehicle cabin interior information acquired by the vehicle cabin interior information acquisition unit after transmission of the vehicle cleaning information.

The vehicle management system may be configured to further include a vehicle renting management unit prohibiting renting of the vehicle until a predetermined renting prohibited period elapses after the vehicle is returned, in a case where the vehicle cleaning handling unit transmits the vehicle cleaning information to the user terminal when the vehicle is returned and where the vehicle cabin Interior cleaning estimation unit does not estimate that the vehicle cabin interior is cleaned.

Next, a second aspect for achieving the above object provides a vehicle management method being executed by a vehicle management system, the vehicle management method including: a vehicle cabin interior information acquisition step of acquiring vehicle cabin interior information indicating a situation in a vehicle cabin of a vehicle; a dirt factor element recognition step of recognizing a dirt factor element based on the vehicle cabin interior information acquired by the vehicle cabin interior information acquisition step, the dirt factor element being an element serving as a possible factor of dirt in the vehicle cabin; and a vehicle cleaning handling step of transmitting vehicle cleaning information about cleaning of the vehicle to at least either one of a user terminal and a maintenance management server when the dirt factor element is recognized by the dirt factor element recognition step, the user terminal being used by a user of the vehicle, the maintenance management server managing maintenance of the vehicle.

Advantageous Effects of Invention

In the above vehicle management system, a vehicle cleaning handling unit transmits vehicle cleaning information to at least either one of a user terminal and a maintenance management server when a dirt factor element recognition unit recognizes a dirt factor element in a vehicle cabin. Accordingly, a user or the maintenance management server is advised to handle cleaning of a vehicle cabin interior, and dirt in the vehicle cabin may thereby be prevented from being left.

DETAILED DESCRIPTION OF THE PREFERRED EMBODIMENTS

[1. Form for Advising Cleaning of Vehicle Cabin Interior]

Figure 1:
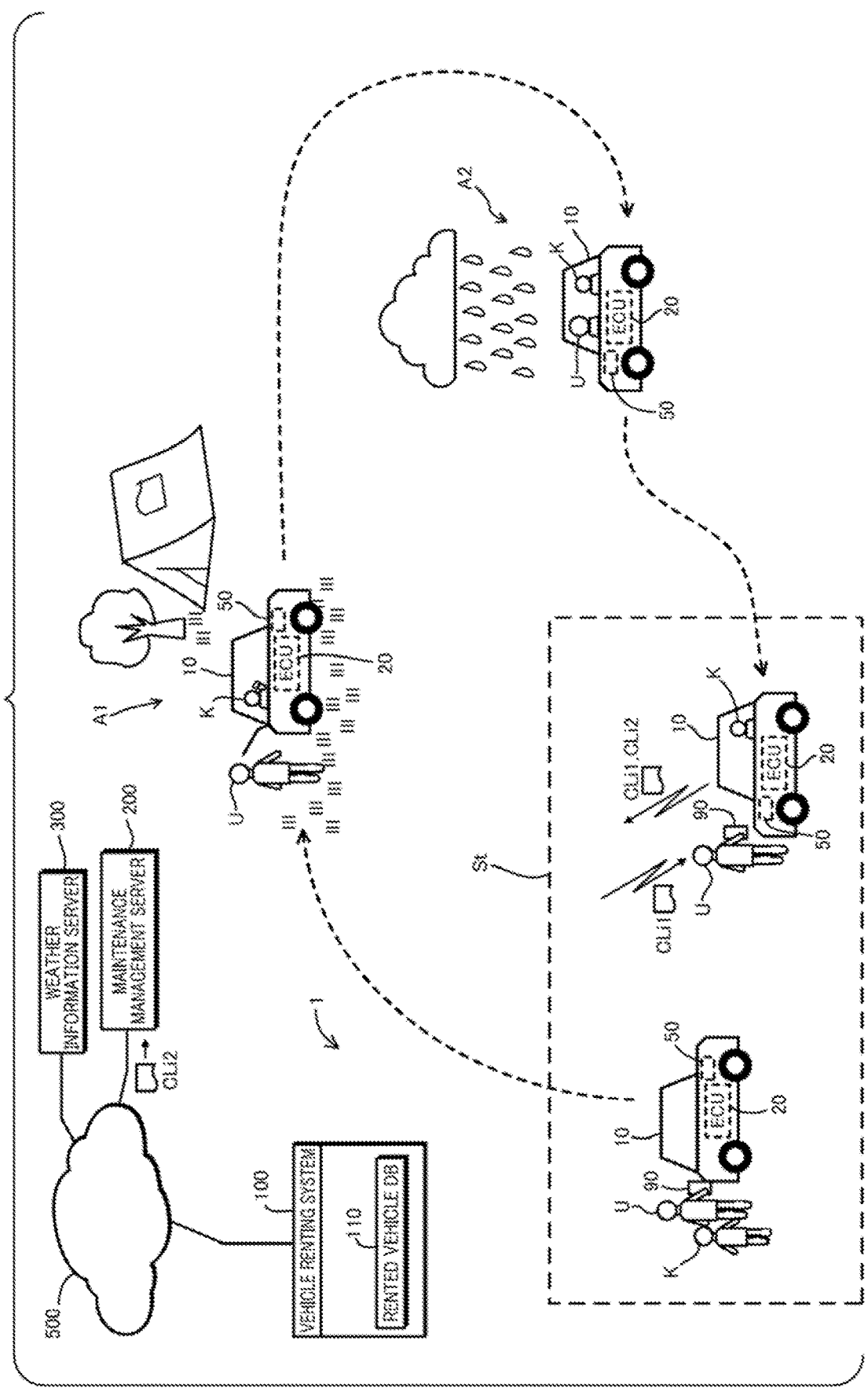
FIG. 1 is an explanatory diagram of a form in which a vehicle management system recognizes a dirt factor element in a vehicle cabin and a use situation of a vehicle and advises cleaning of a vehicle cabin interior.

With reference to FIG. 1, a description will be made about a form in which a vehicle management system 1 recognizes a dirt factor element in a vehicle cabin of a vehicle 10 and a use situation of the vehicle 10 and advises cleaning of a vehicle cabin interior of the vehicle 10. The vehicle management system 1 includes a vehicle control device 20 installed in the vehicle 10 and a vehicle renting system 100 performing communication with the vehicle control device 20 via a communication network 500.

The vehicle 10 is a rented vehicle rented to a user U by car-sharing, a car rental service, or the like and includes the vehicle control device 20 controlling an action of the vehicle 10 and an automotive navigation system (automotive navigation device) 50. The vehicle renting system 100 manages renting of the vehicle 10 while setting a parking lot St as a delivery place.

The vehicle renting system 100 includes a rented vehicle database (DB) 110 storing management data of plural rented vehicles including the vehicle 10. The rented vehicle DB 110 records information of a rented vehicle, a reservation status of a rented vehicle, information of a user of a rented vehicle, and so forth with respect to each rented vehicle.

The information of the rented vehicle includes a communication address of the rented vehicle, and the information of the user includes a communication address of a user terminal used by the user. The vehicle renting system 100 uses those communication addresses and thereby performs communication between the vehicle 10 and a user terminal 90 used by the user U via the communication network 500. Further, the vehicle control device 20 performs communication between a maintenance management server 200 managing maintenance of the vehicle 10 and a weather information server 300 providing weather information via the communication network 500. The user terminal 90 is a communication terminal such as a smartphone, a portable terminal, or a tablet terminal, each of which is carried and used by the user U.

The user U who reserves renting of the vehicle 10 starts use of the vehicle 10 from the parking lot St, returns the vehicle 10 to the parking lot St, and then finishes use of the vehicle 10. During use by the user U, the vehicle control device 20 of the vehicle 10 acquires information in the vehicle cabin (images, sounds, smells, and so forth in the vehicle cabin) of the vehicle 10 and recognizes an element that may become a factor of occurrence of dirt such as eating and drinking in the vehicle cabin (dirt factor element).

Further, the vehicle control device 20 recognizes an area or facility visited by the user U by the vehicle 10 and traveling of the vehicle 10 in predetermined weather (for example, bad weather such as rain or snow) based on positions of the vehicle 10 recognized by the automotive navigation system 50. In FIG. 1, as illustrated by A1, the user U visits a campsite (corresponding to a predetermined facility of the present invention) on a rough ground with a child K by the vehicle 10, and the child K is eating and drinking in the vehicle cabin. Further, as illustrated in A2, the vehicle 10 travels in rainy weather.

When the vehicle control device 20 recognizes the dirt factor element and recognizes that the vehicle 10 is used in a situation, in which dirt is likely to occur, such as A1 or A2, the vehicle control device 20 transmits first vehicle cleaning information CLi1 to the user terminal 90 in order to advise cleaning of the vehicle cabin interior when the vehicle 10 is returned. Further, when the user U does not clean the vehicle cabin interior of the vehicle 10 in response to transmission of the first vehicle cleaning information CLi1, the vehicle control device 20 transmits second vehicle cleaning information CLi2 to the maintenance management server 200 and requests cleaning of the vehicle cabin interior of the vehicle 10.

Cleaning of the vehicle cabin interior of the vehicle 10 by the user U is advised by transmission of the first vehicle cleaning information CLi1, cleaning of the vehicle cabin interior of the vehicle 10 is requested to the maintenance management server 200 by transmission of the second vehicle cleaning information CLi2, and dirt in the vehicle cabin of the vehicle 10 may thereby be prevented from being left.

[2. Configuration of Vehicle Management System]

A configuration of the vehicle management system 1 will be described with reference to FIG. 2. The vehicle management system 1 is composed of the vehicle control device 20 installed in the vehicle 10 and the vehicle renting system 100.

The vehicle control device 20 is an electronic control unit (ECU) composed of a central processing unit (CPU) not illustrated, a memory 30, and so forth. The vehicle 10 includes the vehicle control device 20, a communication unit 40, a touch panel 41, a speaker 42, a vehicle cabin camera 43, a microphone 44, an odor sensor 45, a load sensor 46, a rain sensor 47, a start switch 48, the automotive navigation system 50, a battery 60, and so forth.

The communication unit 40 is an interface for performing communication among the vehicle renting system 100, the maintenance management server 200, and the weather information server 300 via the communication network 500. The communication unit 40 receives, as an input, information output from the vehicle control device 20, transmits the information to the outside, and outputs information received from the outside to the vehicle control device 20.

The touch panel 41 is configured by arranging a touch sensor on a surface of a flat display such as a liquid crystal panel, inputs an operation signal of the touch sensor to the vehicle control device 20, and changes a display screen in accordance with a control signal output from the vehicle control device 20. The speaker 42 amplifies a sound signal output from the vehicle control device 20 and outputs that to the vehicle cabin interior.

The vehicle cabin camera 43 photographs the vehicle cabin interior and outputs the image of the vehicle cabin interior to the vehicle control device 20. The microphone 44 detects a sound in the vehicle cabin and outputs a sound signal to the vehicle control device 20. The odor sensor 45 detects an odor in the vehicle cabin and outputs an odor detection signal to the vehicle control device 20. The load sensor 46 detects a load exerted on a seat (not illustrated) of the vehicle 10 and outputs a load detection signal indicating a load level to the vehicle control device 20.

The rain sensor 47 detects a water drop dropping on a windshield (not illustrated) or the like of the vehicle 10, thereby detects rainy weather, and outputs a rainy weather detection signal to the vehicle control device 20. The automotive navigation system 50 includes a Global Positioning System (GPS) sensor (not illustrated) and map data and performs a route guidance to a destination based on the present position of the vehicle 10 detected by the GPS sensor and on the map data. The route guidance is performed by display of a guidance screen on the touch panel 41 and by an output of guidance sounds from the speaker 42.

The start switch 48 is switched between a power source ON instruction state and a power source OFF instruction state in accordance with an operation by the user U. Further, the start switch 48 outputs a power source ON instruction signal to the vehicle control device 20 when becoming the power source ON instruction state and outputs a power source OFF instruction signal to the vehicle control device 20 when becoming the power source OFF instruction state. The vehicle control device 20 starts power supply from the battery 60 to electrical equipment; installed in the vehicle 10 when the power source ON instruction signal is input and stops power supply from the battery 60 to the electrical equipment when a power source OFF instruction is input. The user U turns the start switch 48 to the power source ON instruction state when use of the vehicle 10 is started and turns the start switch 48 to an OFF instruction state when use of the vehicle 10 is finished.

In the memory 30, a control program 31 of the vehicle 10, reference image data 32, and monitoring target sound data 33 are saved. In the reference image data 32, reference images for a determination about whether or not dirt is present in the vehicle cabin based on an image of the vehicle cabin interior are recorded, and in the monitoring target sound data 33, data of monitoring target sounds for a determination about whether dirt is present in the vehicle cabin based on a sound in the vehicle cabin are recorded. The CPU reads and executes a control program and thereby functions as a vehicle cabin interior information acquisition unit 21, a dirt factor element recognition unit 22, a vehicle position recognition unit 23, a vehicle use situation recognition unit 24, a weather recognition unit 25, a power source state recognition unit 26, a vehicle cleaning handling unit 27, and a vehicle cabin interior cleaning estimation unit 28.

A process executed by the vehicle cabin interior information acquisition unit 21 corresponds to a vehicle cabin interior information acquisition step in a vehicle management method of the present invention, and a process executed by the dirt factor element recognition unit 22 corresponds to a dirt factor element recognition step in the vehicle management method of the present Invention. A process executed by the vehicle cleaning handling unit 27 corresponds to a vehicle cleaning handling step in the vehicle management method of the present invention.

The vehicle cabin interior information acquisition unit 21 acquires an image of the vehicle cabin interior photographed by the vehicle cabin camera 43, a sound in the vehicle cabin input to the microphone 44, a level of an odor in the vehicle cabin, the level of the odor being detected by the odor sensor 45, and a level of a load exerted on a seat in the vehicle cabin, the level of the load being detected by the load sensor 46, as vehicle cabin interior information of the vehicle 10.

The dirt factor element recognition unit 22 recognizes the following first element to fourth element as dirt factor elements based on the vehicle cabin interior information acquired by the vehicle cabin interior information acquisition unit 21.

First element: a situation in which an occupant contacts with food and drink. The dirt factor element recognition unit 22 extracts an image portion of the occupant and food and drink from an image of the vehicle cabin interior, the image acquired by the vehicle cabin interior information acquisition unit 21, and thereby recognizes a situation in which the occupant contacts with food and drink. Contact with food and drink by the occupant is recognized, and occurrence of dirt in the vehicle cabin may thereby be predicted, the dirt being due to spilled food accompanying eating and drinking in the vehicle cabin.

Note that recognition of a sound, whose concordance rate is a third predetermined value or greater, in a situation in which the occupant contacts with food and drink may be set as the first element, the concordance rate being obtained between the sound in the vehicle cabin and the monitoring target sound recorded in the monitoring target sound data. As the monitoring target sounds, for example, a sound in a case of opening a lid of a canned drink or a bottled drink and a sound in a case of opening a bag of a snack are used. A determination is also made about a sound in the vehicle cabin, and a situation in which dirt in the vehicle cabin highly possibly occurs may thereby be recognized as the first element.

Second element: a situation in which a child is riding in the vehicle. The dirt factor element recognition unit 22 extracts an image portion of the child from an image of the vehicle cabin interior, the image acquired by the vehicle cabin interior information acquisition unit 21, and thereby recognizes a situation in which the child is riding in the vehicle. Note that voice of the child is extracted from sounds in the vehicle cabin acquired by the vehicle cabin interior information acquisition unit 21, and a situation in which the child is riding in the vehicle may thereby be recognized. A ride of the child in the vehicle is recognized, and occurrence of dirt in the vehicle cabin due to behavior of the child may thereby be predicted.

Third element: a fact that the concordance rate between an image of the vehicle cabin interior at a finish of use of the vehicle 10 and the reference image recorded in the reference image data 32 is a first predetermined value or smaller. The vehicle cabin interior information acquisition unit 21 acquires the image of the vehicle cabin interior at the finish of use of the vehicle 10 by photographing by the vehicle cabin camera 43 at a timing when the start switch 48 is operated to OFF. As the reference image, an image of the vehicle cabin interior in a state where dirt is not present or an image of the vehicle cabin interior at a time point when the user U starts using the vehicle 10 is used. By using the concordance rate between the image of the vehicle cabin interior at the finish of use of the vehicle and the reference image, occurrence of dirt in the vehicle cabin may be estimated from the change in the situation in the vehicle cabin.

Fourth element: a fact that the level of the odor in the vehicle cabin is a predetermined level or higher. An odor emitted from food and drink is detected when eating and drinking are performed in the vehicle cabin, and occurrence of dirt in the vehicle cabin due to spilled food may thereby be predicted.

Fifth element: a fact that the concordance, rate between a sound in the vehicle cabin and the monitoring target sound recorded in the monitoring target sound data 33 is a second predetermined value or greater. As described above, the sound in a case of opening a lid of a canned drink or a bottled drink or the sound in a case of opening a bag of a snack is recognized, and occurrence of dirt in the vehicle cabin due to spilled food may thereby be predicted.

Here, in the above third element, the concordance rate between the image of the vehicle cabin interior at the finish of use of the vehicle 10 and the reference image is calculated by using an image recognition technology such as template matching. Further, in the above fifth element, the concordance rate between the sound in the vehicle cabin and the monitoring target sound is calculated by analyzing the intensity of a sound such as a sound pressure, a frequency band, or the like.

The vehicle position recognition unit 23 recognizes a spot where the vehicle 10 is positioned based on the present position (latitude and longitude) of the vehicle 10 detected by the automotive navigation system 50 and the map data. The weather recognition unit 25 recognizes the weather at the spot where the vehicle 10 is positioned based on a detection situation of the rain sensor 47, weather information of an area including the present position of the vehicle 10, the weather Information being acquired from the weather information server 300, and so forth.

The vehicle use situation recognition unit 24 recognizes that the user U visits a predetermined area or a predetermined facility by the vehicle 10 from the position of the vehicle 10 recognized by the vehicle position recognition unit 23. The predetermined area and the predetermined facility are set on the assumption that dirt in the vehicle cabin is likely to occur. The predetermined area is an area such as seashore or grassland where shoes or clothes of the occupant are likely to get dirty when the occupant gets off the vehicle, for example, and the predetermined facility is also a facility such as a campsite or a ski site where shoes or clothes of the occupant are likely to get dirty when the occupant gets off the vehicle. Further, the vehicle use situation recognition unit 24 recognizes that the vehicle 10 is used in bad weather such as rain or snow based on the position of the vehicle 10 recognized by the vehicle position recognition unit 23 and the weather recognized by the weather recognition unit 25.

The power source state recognition unit 26 recognizes whether the battery 60 is in a power source ON state where power is supplied from the battery 60 to the electrical equipment or a power source OFF state where power supply from the battery 60 to the electrical equipment is shut off in accordance with an ON instruction signal and OFF instruction signal output from the start switch 48. The vehicle cleaning handling unit 27 transmits the first vehicle cleaning information CLi1 to the user terminal 90 and transmits the second vehicle cleaning information CLi2 to the maintenance management server 200 when the dirt factor element recognition unit 22 recognizes at least any one of the above first, element to fifth element, the vehicle use situation recognition unit 24 recognizes that the user U visits the predetermined area or the predetermined facility by the vehicle 10, and when it is recognized that the vehicle 10 travels in a situation in which the weather recognition unit 25 recognizes bad weather.

The vehicle cabin interior cleaning estimation unit 28 estimates that the user U has cleaned the vehicle cabin interior based on the vehicle cabin interior information acquired by the vehicle cabin interior information acquisition unit 21. Specifically, the vehicle cabin interior cleaning estimation unit 28 estimates that the user U has cleaned the vehicle cabin interior when at least any one of the following estimation situation 1 to estimation situation 4 is recognized.

Estimation situation 1: the concordance rate between an image of the vehicle cabin interior photographed by the vehicle cabin camera 43 after transmission of the first vehicle cleaning information CLi1 to the user terminal 90 and the reference image is higher than a first predetermined value.

Estimation situation 2: the level of the odor detected by the odor sensor 45 after transmission of the first vehicle cleaning information CLi1 to the user terminal 90 is a predetermined level or lower.

Estimation situation 3: the load detected by the load sensor 46 after transmission of the first vehicle cleaning information CLi1 to the user terminal 90 fluctuates in a prescribed width or wider through a predetermined time.

Estimation situation 4: an occupant such as the user U is present in the vehicle cabin of the vehicle 10 from a time point when the power source state recognition unit 26 recognizes that the power source ON state is switched to the power source OFF state after transmission of the first vehicle cleaning information CLi1 to the user terminal 90 until a predetermined time elapses.

[3. Vehicle Cabin Dirt Handling Processing]

Following flowcharts illustrated in FIG. 3 to FIG. 5, a description will be made about vehicle cabin dirt handling processing executed by the vehicle control device 20 and the vehicle renting system 100.

Figure 3:
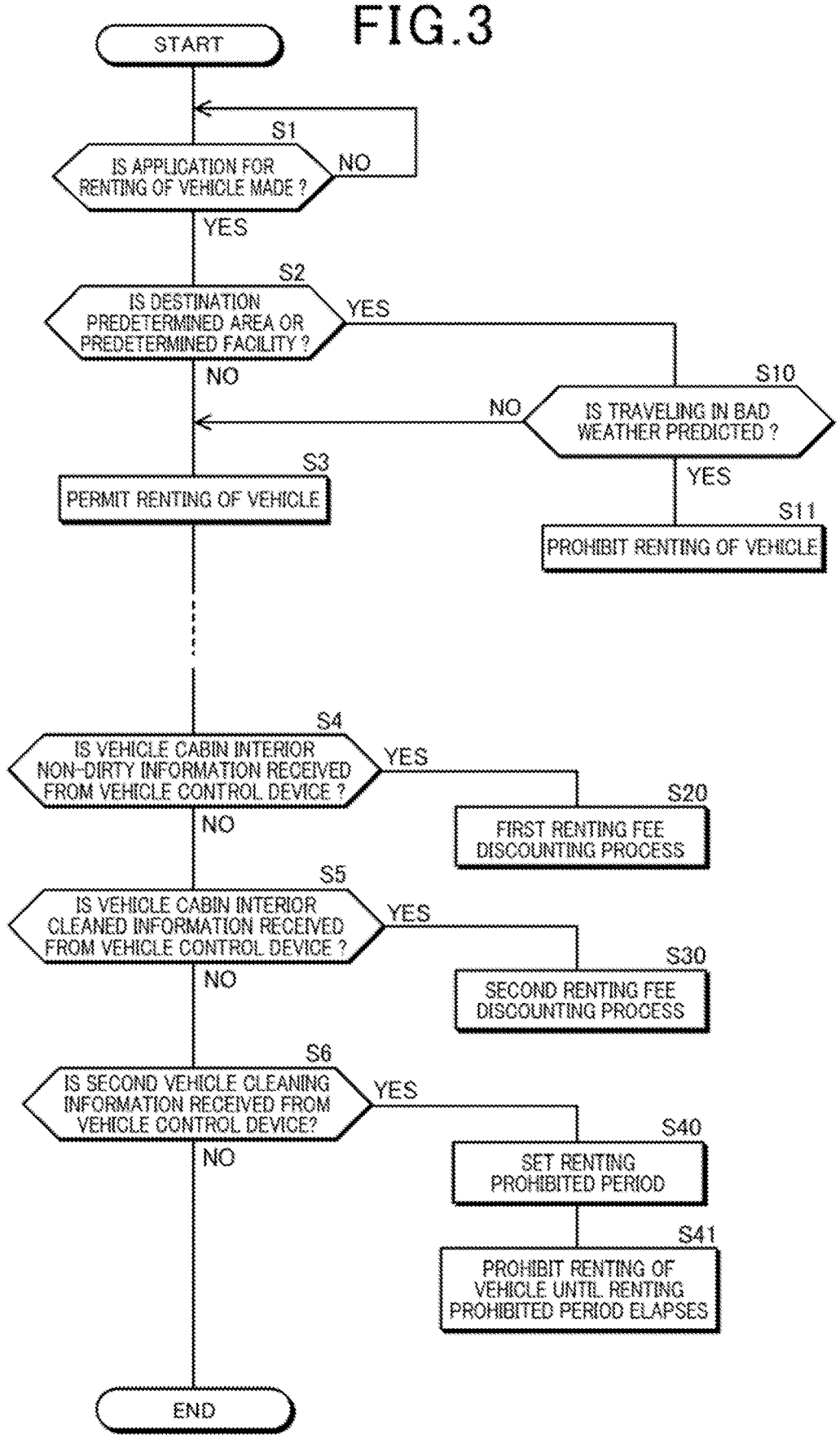
FIG. 3 is a flowchart of vehicle cabin dirt handling processing by a vehicle renting system.

FIG. 3 is the flowchart of the vehicle cabin dirt handling processing executed by the vehicle renting system 100. In step S1 in FIG. 3, a vehicle renting management unit 101 of the vehicle renting system 100 moves the processing to step S2 when an application for renting of the vehicle 10 is made by the user U. The user U executes vehicle renting application software by the user terminal 90 and performs an operation of the application for renting the vehicle 10, and renting application information is thereby transmitted from the user terminal 90 to the vehicle renting system 100. The vehicle renting system 100 receives this renting application information and accepts the application for renting of the vehicle 10 by the user U.

In step S2, the vehicle renting management unit 101 recognizes a destination to be visited by the user U by the vehicle 10 from use plan information of the vehicle 10, the use plan information being provided from the user U, and determines whether or not the destination is the above-described predetermined area or predetermined facility. Then, the vehicle renting management unit 101 moves the processing to step S10 when the destination is the predetermined area or the predetermined facility but moves the processing to step S3 when the destination is neither the predetermined area nor the predetermined facility.

In step S10, the vehicle renting management unit 101 determines whether or not use in bad weather such as a snowstorm is predicted during a use period of the vehicle 10 by the user U based on information of predicted weather, the information being provided from the weather information server 300. Then, the vehicle renting management unit 101 moves the processing to step S11 when movement in bad weather is predicted and prohibits renting of the vehicle 10. Accordingly, use of the vehicle 10 under a condition with a very strong possibility of occurrence of dirt in the vehicle cabin may be avoided which is movement to the predetermined area or the predetermined facility in bad weather, and occurrence of dirt in the vehicle cabin of the vehicle 10 may thereby be prevented.

On the other hand, when movement in bad weather is not predicted, the vehicle renting management unit 101 moves the processing from step S2 to step S3 and permits renting of the vehicle 10 to the user U. Step S4 and subsequent steps are processes in a case where the vehicle 10 is returned, and process contents will be described later.

Figure 4:
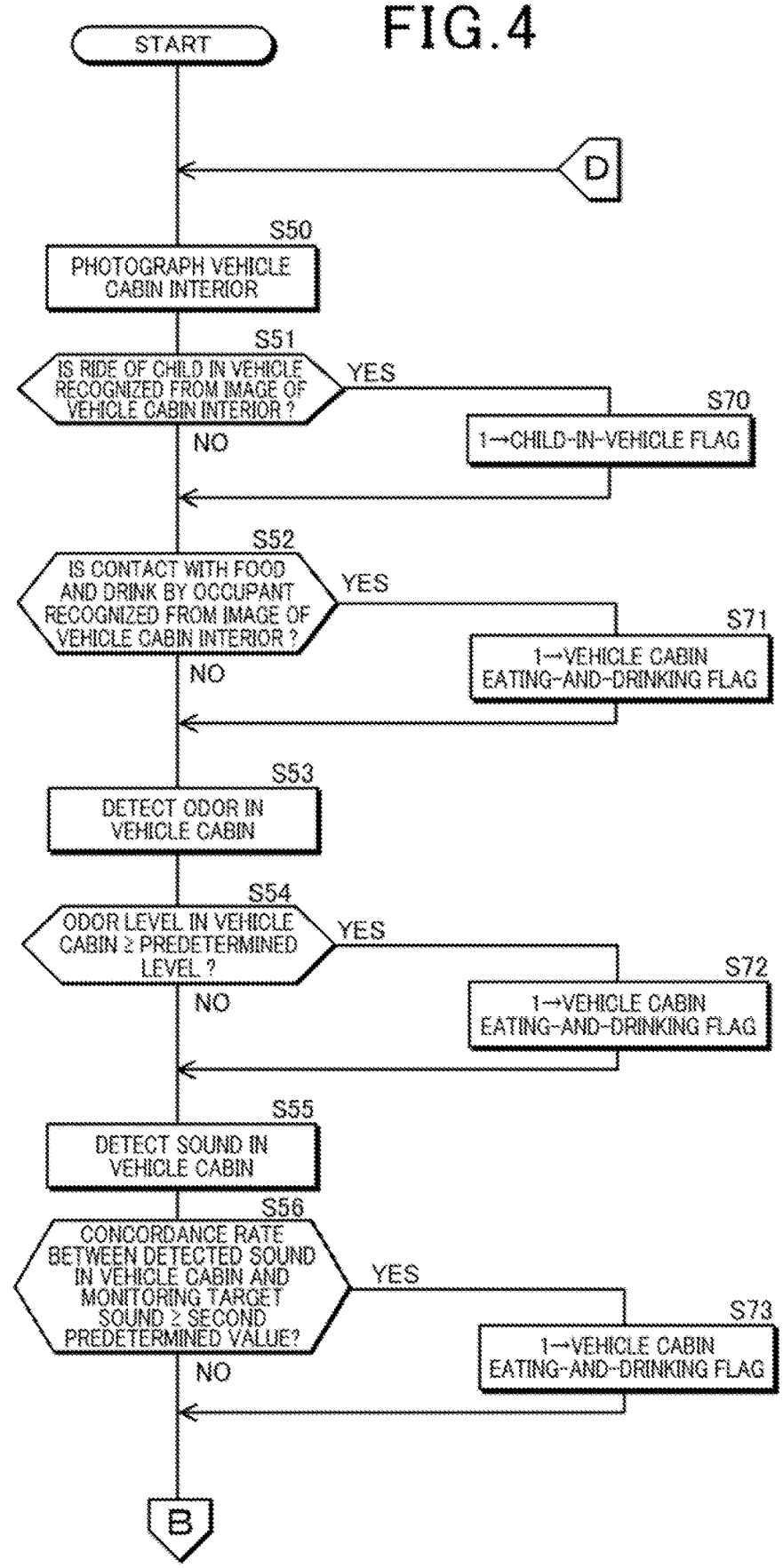
FIG. 4A is a first flowchart of vehicle cabin dirt, handling processing by a vehicle control device.
Figure 5:
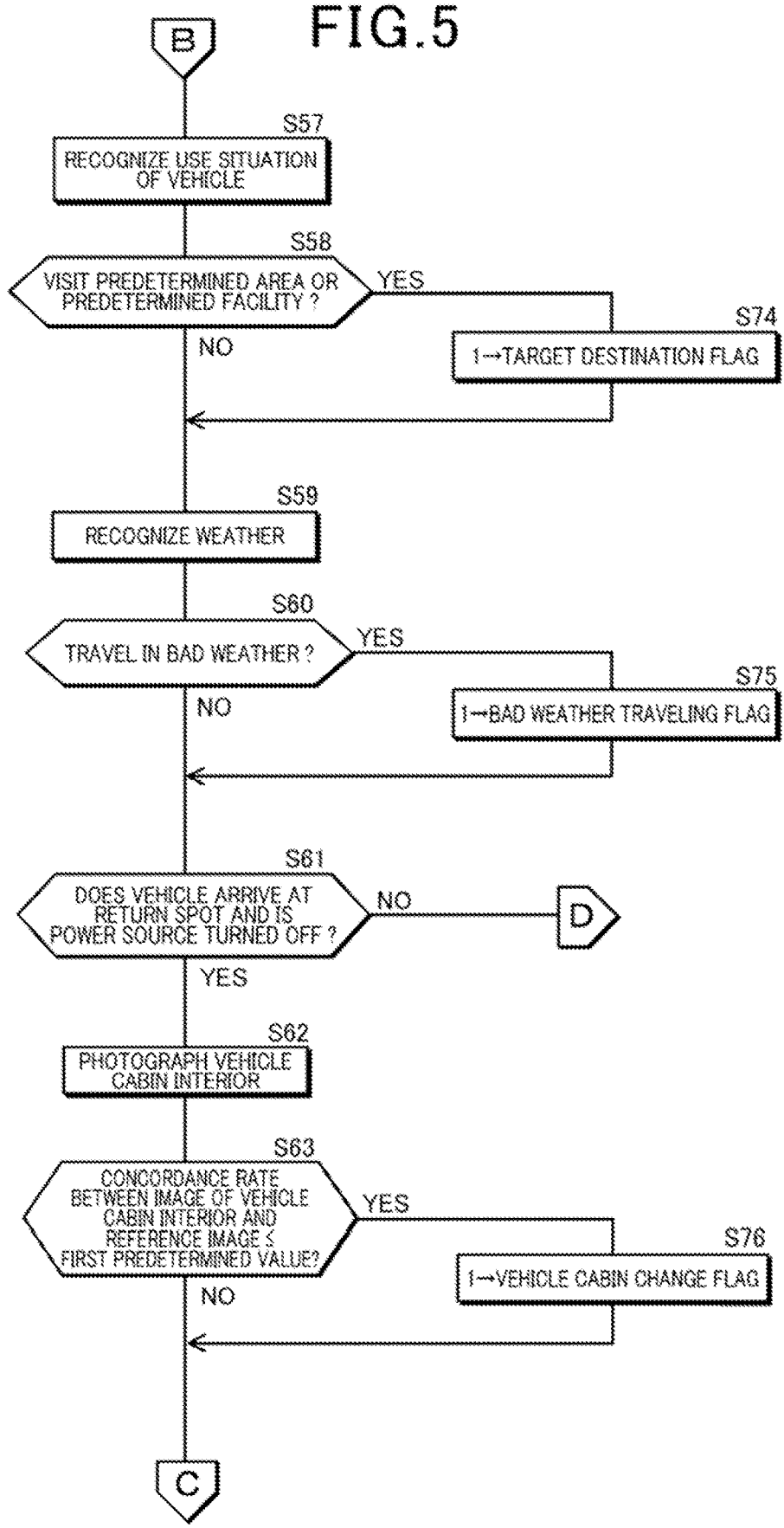
FIG. 5 is a second flowchart of the vehicle cabin dirt handling processing by the vehicle control device.
Figure 6:
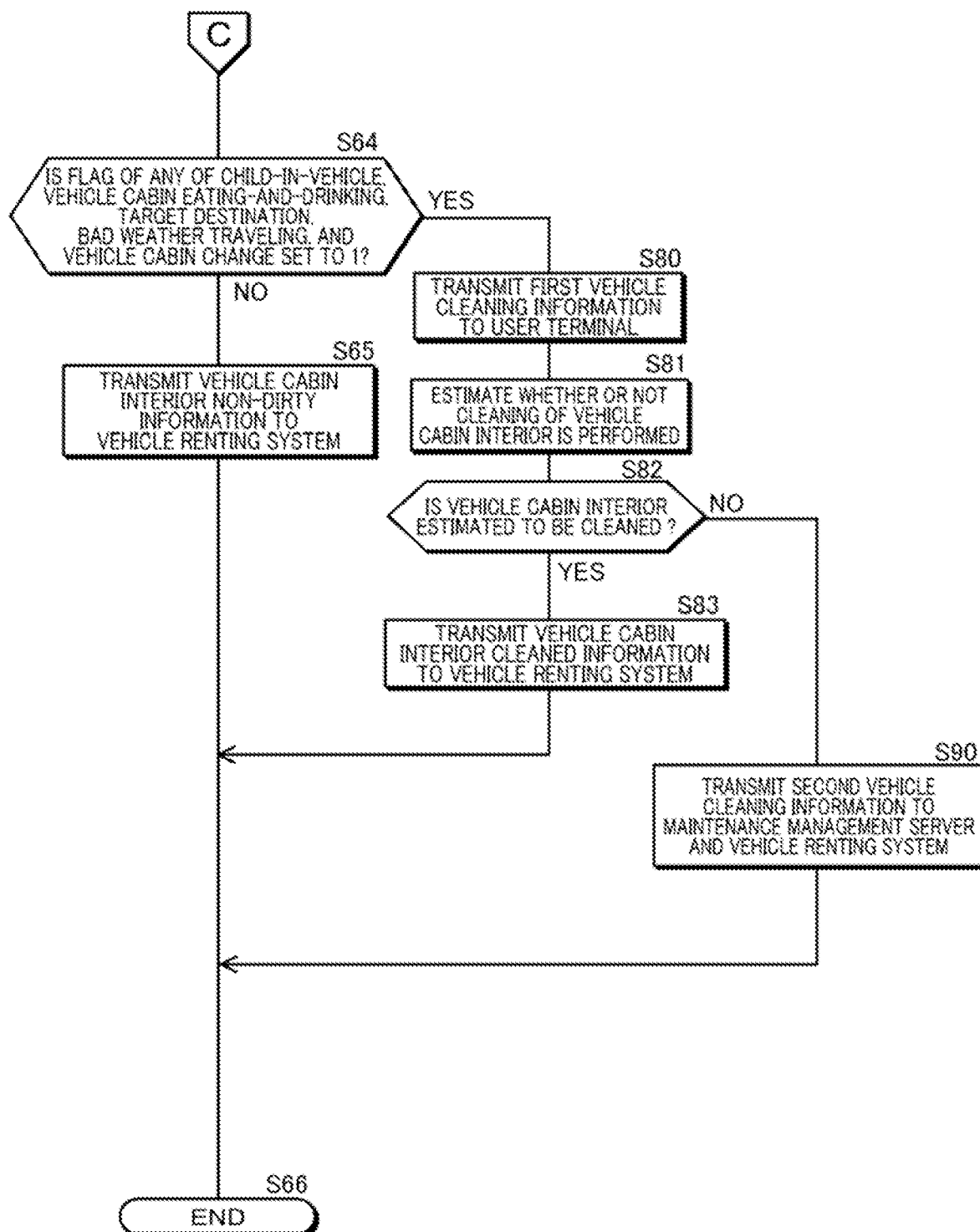
FIG. 6 is a third flowchart of the vehicle cabin dirt handling processing by the vehicle control device.

Next, FIG. 4 to FIG. 6 are flowcharts of vehicle cabin dirt handling processing executed by the vehicle control device 20. The vehicle control device 20 starts the processing of the flowcharts of FIG. 4 to FIG. 6 when a start of use of the vehicle 10 is recognized. The vehicle control device 20 determines that use of the vehicle 10 is started when the power source state recognition unit 26 recognizes that the power source OFF state is switched to the power source ON state.

In step S50 in FIG. 4, the vehicle cabin interior information acquisition unit 21 photographs the vehicle cabin interior of the vehicle 10 by the vehicle cabin camera 43 and acquires an image of the vehicle cabin interior. In next step S51, the dirt factor element recognition unit 22 moves the processing to step S70 when a ride of a child in the vehicle (the above second element) is recognized from the image of the vehicle cabin interior, sets a child-in-vehicle flag to "1", and moves the processing to step S52. Note that an initial value of each flag is set as "0". On the other hand, the dirt factor element recognition unit 22 moves the processing to step S52 when a ride of a child in the vehicle is not recognized from the image of the vehicle cabin interior.

In step S52, the dirt factor element recognition unit 22 moves the processing to step S71 when a situation in which an occupant contacts with food and drink (the above first element) is recognized from the image of the vehicle cabin interior, sets a vehicle cabin eating-and-drinking flag to "1", and moves the processing to step S53. On the other hand, when the situation in which the occupant contacts with food and drink is not recognized from the image of the vehicle cabin interior, the dirt factor element recognition unit 22 moves the processing to step S53.

In step S53, the vehicle cabin interior information acquisition unit 21 detects the odor in the vehicle cabin by the odor sensor 45 and acquires an odor level in the vehicle cabin. In next step S54, the dirt, factor element recognition unit 22 moves the processing to step S72 when the odor level in the vehicle cabin is the predetermined level or higher (the above fourth element), sets the vehicle cabin eating-and-drinking flag to "1", and moves the processing to step S55. On the other hand, the dirt factor element recognition unit 22 moves the processing from step S54 to step S55 when the odor level in the vehicle cabin is lower than the predetermined level.

In step S55, the vehicle cabin interior information acquisition unit 21 detects the sound in the vehicle cabin by the microphone 44. In next step S56, the dirt factor element recognition unit 22 moves the processing to step S73 when the concordance rate between the sound in the vehicle cabin and the monitoring target sound is the second predetermined value or greater (the above fifth element), sets the vehicle cabin eating-and-drinking flag to "1", and moves the processing to step S57 in FIG. 5. On the other hand, when the concordance rate between the sound in the vehicle cabin and the monitoring target sound is lower than the second predetermined value, the dirt factor element recognition unit 22 moves the processing from step S56 to step S57 in FIG. 5.

In step S57, the vehicle use situation recognition unit 24 recognizes the use situation of the vehicle 10 based on the present position of the vehicle 10 recognized by the vehicle position recognition unit 23. In next step S58, the vehicle use situation recognition unit 24 moves the processing to step S74 when it is recognized that the user U visits the predetermined area or the predetermined facility by the vehicle 10, sets a target destination flag to "1", and moves the processing to step S59. On the other hand, when the user U visits neither the predetermined area nor the predetermined facility, the vehicle use situation recognition unit 24 moves the processing from step S58 to step S59.

In step S59, the weather recognition unit 25 recognizes the weather of the spot where the vehicle 10 is positioned. In next step S60, when it is recognized that the vehicle 10 travels in bad weather based on the position of the vehicle 10 recognized by the vehicle position recognition unit 23 and the weather recognized by the weather recognition unit 25, the vehicle use situation recognition unit 24 moves the processing to step S75, sets a bad weather traveling flag to "1", and moves the processing to step S61. On the other hand, when it is not recognized that the vehicle 10 travels in bad weather, the vehicle use situation recognition unit 24 moves the processing from step S60 to step S61.

In step S61, the vehicle cabin interior information acquisition unit 21 moves the processing to step S62 when the vehicle position recognition unit 23 recognizes that the vehicle 10 arrives at the parking lot St (see FIG. 1) as a return spot and stands still and the power source state recognition unit 26 recognizes the power source OFF state. On the other hand, when the vehicle 10 does not arrive at the parking lot St or is not in the power source OFF state, the vehicle cabin interior information acquisition unit 21 moves the processing to step S50 in FIG. 4 and repeatedly executes processes of step S50 and subsequent steps.

In step S62, the vehicle cabin interior information acquisition unit 21 photographs the vehicle cabin interior by the vehicle cabin camera 43 and acquires an image of the vehicle cabin interior. In next step S63, the dirt factor element recognition unit 22 moves the processing to step S76 when the concordance rate between the image of the vehicle cabin interior and the reference image is the first predetermined value or smaller, sets a vehicle cabin change flag to "1", and moves the processing to step S64 in FIG. 6. On the other hand, when the concordance rate between the image of the vehicle cabin interior and the reference image is higher than the first predetermined value, the processing is moved from step S63 to step S64 in FIG. 6.

In step S64 in FIG. 6, the vehicle cleaning handling unit 27 moves the processing to step S80 when at least one of the child-in-vehicle flag, the vehicle cabin eating-and-drinking flag, the target destination flag, the bad weather traveling flag, and the vehicle cabin change flag is set to "1". On the other hand, when each of the child-in-vehicle flag, the vehicle cabin eating-and-drinking flag, the target destination flag, the bad weather traveling flag, and the vehicle cabin change flag is set to "0", the vehicle cleaning handling unit 27 moves the processing from step S64 to step S65.

In step S80, the vehicle cleaning handling unit 27 transmits the first vehicle cleaning information CLi1 for advising cleaning of the vehicle cabin interior to the user terminal 90. In next step S81, the vehicle cabin interior cleaning estimation unit 28 estimates whether or not cleaning of the vehicle cabin interior is performed. In next step S82, the vehicle cleaning handling unit 27 moves the processing to step S83 when the vehicle cabin interior cleaning estimation unit 28 estimates that the vehicle cabin interior is cleaned, transmits vehicle cabin interior cleaned information indicating that the vehicle cabin interior is cleaned to the vehicle renting system 100, and moves the processing to step S66.

On the other hand, when the vehicle cabin interior cleaning estimation unit 28 does not estimate that the vehicle cabin interior is cleaned, the vehicle cleaning handling unit 27 moves the processing from step S82 to step S90, transmits the second vehicle cleaning information CLi2 for requesting cleaning of the vehicle 10 to the maintenance management server 200 and the vehicle renting system 100, and moves the processing to step S66. Further, in step S65, the vehicle cleaning handling unit 27 transmits vehicle cabin interior non-dirty information reporting that the vehicle cabin interior is not dirty to the vehicle renting system 100.

Referring to FIG. 3, a first renting fee discounting unit 102 of the vehicle renting system 100 moves the processing to step S20 when the vehicle cabin interior non-dirty information transmitted from the vehicle control device 20 is received in step S4 and executes a first renting fee discounting process. The first renting fee discounting process is a process of discounting a renting fee of the vehicle 10 at a first predetermined amount or a first predetermined rate from a regular fee. As described above, the renting fee of the vehicle 10 is discounted, and an incentive to carefully use the vehicle 10 without, making the vehicle cabin interior of the vehicle 10 dirty may thereby be given to the user U.

Further, a second renting fee discounting unit 103 moves the processing to step S30 when the vehicle cabin interior cleaned information transmitted from the vehicle control device 20 is received in step S5 and executes a second renting fee discounting process. The second renting fee discounting process is a process of discounting the renting fee of the vehicle 10 at only a second predetermined amount or a second predetermined rate from the regular fee. As described above, the renting fee of the vehicle 10 is discounted, and an incentive to clean the vehicle cabin interior in returning the vehicle 10 may thereby be given to the user U. Note that the first predetermined amount and the second predetermined amount may be set to the same amount or may be set to different amounts. Also, the first predetermined rate and the second predetermined rate may be set to the same rate or may be set to different rates. For example, the first predetermined amount is set larger than the second predetermined amount, or the first predetermined rate is set higher than the second predetermined rate, and the incentive to use the vehicle 10 without making the vehicle cabin interior of the vehicle 10 dirty may thereby be enhanced.

Further, the vehicle renting management unit 101 moves the processing to step S40 when the second vehicle cleaning information CLi2 transmitted from the vehicle control device 20 is received in step S6 and sets a renting prohibited period of the vehicle 10. The renting prohibited period is set in consideration of a period needed for cleaning of the vehicle cabin interior of the vehicle 10. In next step S41, the vehicle renting management unit 101 prohibits renting of the vehicle 10 until the renting prohibited period elapses. This enables avoidance of a case where a user feels discomfort due to renting of the vehicle 10 in a state where the vehicle cabin interior is dirty.

[4. Other Embodiments]

In the above embodiment, the vehicle management system 1 is composed of the vehicle control device 20 and the vehicle renting system 100; however, configurations included in the vehicle renting system 100 are incorporated in the vehicle control device 20, and the vehicle management system 1 may thereby be composed of only the vehicle control device 20. Further, the vehicle management system 1 may be composed of only the vehicle renting system 100 in which configurations included in the vehicle control device 20 are incorporated.

In a case where the vehicle cabin interior information acquisition unit 21 is included in the vehicle renting system 100, the vehicle cabin interior information acquisition unit 21 acquires pieces of information such as the image of the vehicle cabin interior photographed by the vehicle cabin camera 43, the odor level in the vehicle cabin detected by the odor sensor 45, and the sound in the vehicle cabin detected by the microphone 44 by receiving those from the vehicle 10. Similarly, the vehicle position recognition unit 23 receives information of the present position of the vehicle 10, the present position being detected by the automotive navigation system 50, from the vehicle 10 and thereby recognizes the present position of the vehicle 10.

In the above embodiment, the vehicle renting management unit 101 included in the vehicle renting system 100 sets a non-use period of the vehicle 10, and the first renting fee discounting unit 102 and the second renting fee discounting unit 103 perform the first renting fee discounting process and the second renting fee discounting process for discounting the renting fee of the vehicle 10. As another embodiment, any or all of setting of the non-use period, the first renting fee discounting process, and the second renting fee discounting process may be omitted.

In the above embodiment, the vehicle renting management unit 101 prohibits renting of the vehicle until the renting prohibited period elapses by processes of step S40 and step S41 in FIG. 3; however, those processes may be omitted. Further, whether or not the renting prohibited period is set may be set in accordance with the factor due to which the second vehicle cleaning information CLi2 is transmitted. For example, in a case where the user U visits seashore as the predetermined area in fine weather, it is assumed that the vehicle cabin interior does not become very dirty, and the renting prohibited period may thus not be set. In a case of visiting seashore in rainy weather, it is assumed that the vehicle cabin interior becomes very dirty, and the renting prohibited period may thus be set.

In the above embodiment, the vehicle cabin interior cleaning estimation unit 28 is provided and estimates whether or not cleaning of the vehicle cabin interior is performed; however, the vehicle cabin interior cleaning estimation unit 28 may be omitted, and the second vehicle cleaning information CLi2 may unconditionally be transmitted to the maintenance management server 200 when use of the vehicle 10 is finished. In this case, the maintenance management server 200 arranges a check on whether or not dirt is present in the vehicle cabin of the vehicle 10 and handling of cleaning.

In the above embodiment, the vehicle cleaning handling unit 27 transmits the first vehicle cleaning information CLi1 to the user terminal 90 and transmits the second vehicle cleaning information CLi2 to the maintenance management server 200. As another embodiment, only either one of the first vehicle cleaning information CLi1 and the second vehicle cleaning information CLi2 may be transmitted.

In the above embodiment, when the vehicle 10 arrives at the return spot and the power source is turned off in step S61 in FIG. 5, the vehicle cleaning handling unit 27 transmits first vehicle cleaning information to the user terminal in step S80 in FIG. 6 and transmits second vehicle cleaning information to the maintenance management server 200 in step S90. In this case, the user U checks the first vehicle cleaning information advising cleaning of the vehicle cabin interior after arriving at the return spot, but it is possible that handling of cleaning may not be performed at the return spot.

Accordingly, as another embodiment, the first vehicle cleaning information and the second vehicle cleaning information may be transmitted at a timing when the user U sets the destination of movement by the vehicle 10 to the parking lot St as the return spot of the vehicle 10 by the automotive navigation system 50 after the vehicle use situation recognition unit 24 recognizes that the user U visits the predetermined area or the predetermined facility by the vehicle 10 or that the vehicle 10 is used in bad weather. In this case, the user U who has checked the first vehicle cleaning information may stop by a cleaning facility such as a car wash and clean the vehicle cabin interior of the vehicle 10 before arriving at the return spot. Further, the maintenance management server 200 may prepare for cleaning of the vehicle cabin interior of the vehicle 10 before the vehicle 10 arrives at the return spot. Further, when it is recognized that the vehicle 10 stops by the cleaning facility based on the position of the vehicle 10 recognized by the vehicle position recognition unit 23, the vehicle cabin interior cleaning estimation unit 28 may estimate that the vehicle cabin interior of the vehicle 10 is cleaned.

In the above embodiment, the portable user terminal 90 is described; however, a user terminal of the present invention may be in-vehicle equipment that is installed in the vehicle 10, is used by the user U, and has a function of performing communication with the outside via the communication network 500.

Figure 2:
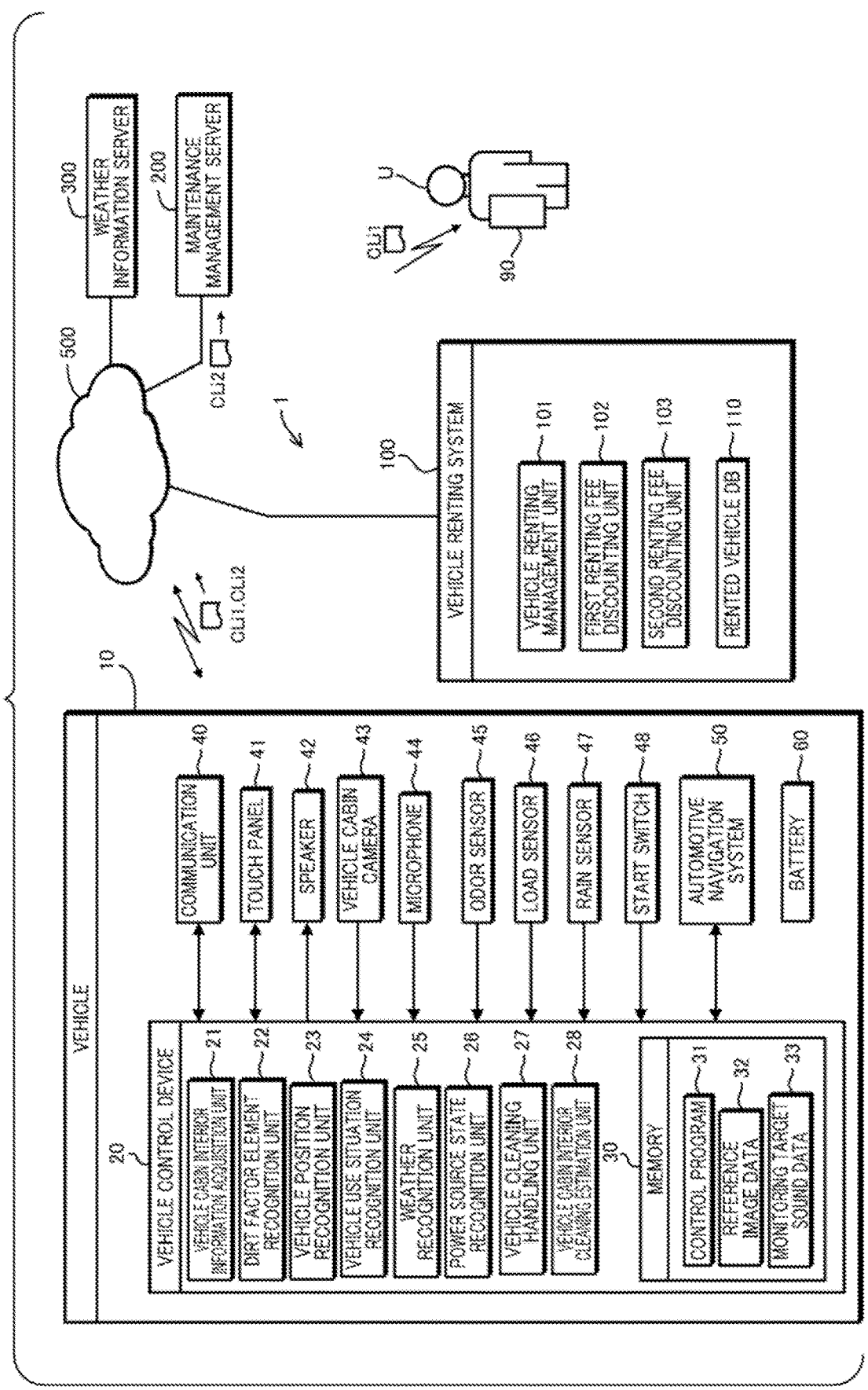
FIG. 2 is an explanatory diagram of a configuration of the vehicle management system.

Note that FIG. 2 is a schematic diagram illustrating the configuration of the vehicle management system 1 by categorizing the configuration in accordance with principal processing contents for easy understanding of the invention of this application, but the configuration of the vehicle management system 1 may be configured based on different categories. Further, processing of each configuration element may be executed by one hardware unit or may be executed by plural hardware units. Further, processing of each configuration element, the processing being illustrated in FIG. 3 to FIG. 6, may be executed by one program or may be executed by plural programs.

[5. Configurations Supported by Above Embodiments]

The above embodiments are specific examples of the following configurations.

(First Item) A vehicle management system including: a vehicle cabin interior information acquisition unit acquiring vehicle cabin interior information indicating a situation in a vehicle cabin of a vehicle; a dirt factor element recognition unit recognizing a dirt factor element based on the vehicle cabin interior information acquired by the vehicle cabin interior information acquisition unit, the dirt factor element being an element serving as a possible factor of dirt in the vehicle cabin; and a vehicle cleaning handling unit transmitting vehicle cleaning information about cleaning of the vehicle to at least either one of a user terminal and a maintenance management server when the dirt, factor element recognition unit recognizes the dirt factor element, the user terminal being used by a user of the vehicle, the maintenance management server managing maintenance of the vehicle.

In the vehicle management system of the first item, the vehicle cleaning handling unit transmits the vehicle cleaning information to at least either one of the user terminal and the maintenance management, server when the dirt, factor element recognition unit recognizes the dirt factor element, in the vehicle cabin. Accordingly, the user or the maintenance management server is advised to handle cleaning of a vehicle cabin interior, and dirt in the vehicle cabin may thereby be prevented from being left.

(Second Item) The vehicle management system according to the first item, in which the vehicle cabin interior information acquisition unit acquires an image of a vehicle cabin interior as the vehicle cabin interior information, the image being photographed by a camera provided in the vehicle, and the dirt factor element recognition unit recognizes a situation in which an occupant, of the vehicle contacts with food and drink in the vehicle cabin as the dirt factor element based on the image of the vehicle cabin interior, the image being acquired by the vehicle cabin interior information acquisition unit.

In the vehicle management system of the second item, a situation in which the occupant contacts with food and drink and dirt in the vehicle cabin due to spilled food is likely to occur may be recognized as the dirt factor element.

(Third Item) The vehicle management system according to the first item or the second item, in which the vehicle cabin interior information acquisition unit acquires an image of a vehicle cabin interior as the vehicle cabin interior information, the image being photographed by a camera provided in the vehicle, and the dirt factor element recognition unit recognizes a situation in which a child rides in the vehicle cabin as the dirt factor element based on the image of the vehicle cabin interior, the image being acquired by the vehicle cabin interior information acquisition unit.

In the vehicle management system of the third item, a situation in which dirt in the vehicle cabin is likely to occur due to behavior of the child riding the vehicle may be recognized as the dirt factor element.

(Fourth Item) The vehicle management system according to any one of the first item to the third item, in which the vehicle cabin interior information acquisition unit acquires an image of a vehicle cabin interior as the vehicle cabin interior information, the image being photographed by a camera provided in the vehicle, and the dirt factor element recognition unit recognizes, as the dirt factor element, a fact that a concordance rate between the image of the vehicle cabin interior, the image being photographed by the camera after use of the vehicle is finished and acquired by the vehicle cabin interior information acquisition unit, and a reference image of the vehicle cabin interior is a first predetermined value or smaller.

In the vehicle management system of the fourth item, a situation, in which the concordance rate between the image of the vehicle cabin interior and the reference image becomes the first predetermined value or smaller and the situation in the vehicle cabin is assumed to be largely changed, may be recognized as the dirt factor element.

(Fifth Item) The vehicle management system according to any one of the first item to the fourth item, in which the vehicle cabin interior information acquisition unit acquires an odor level in the vehicle cabin as the vehicle cabin interior information, the odor level being detected by an odor sensor provided in the vehicle, and the dirt factor element recognition unit recognizes, as the dirt factor element, a fact that the odor level acquired by the vehicle cabin interior information acquisition unit is a predetermined level or higher.

In the vehicle management system of the fifth item, a situation, in which the odor level in the vehicle cabin is the predetermined level or higher, eating and drinking are presumed to be performed based on an odor in the vehicle cabin, and dirt in the vehicle cabin due to spilled food is likely to occur, may be recognized as the dirt factor element.

(Sixth Item) The vehicle management system according to any one of the first item to the fifth item, in which the vehicle cabin interior information acquisition unit acquires a sound in the vehicle cabin as the vehicle cabin interior information, the sound being detected by a microphone provided in the vehicle, and the dirt factor element recognition unit recognizes, as the dirt factor element, a fact that a concordance rate between the sound in the vehicle cabin, the sound being acquired by the vehicle cabin interior information acquisition unit, and a predetermined monitoring target sound is a second predetermined value or greater.

In the vehicle management system of the sixth item, a situation, in which because the concordance rate between the sound in the vehicle cabin and the monitoring target sound is the second predetermined value or greater eating and drinking are presumed to be performed in the vehicle cabin and dirt in the vehicle cabin due to spilled food is likely to occur, may be recognized as the dirt factor element.

(Seventh Item) The vehicle management system according to the first item, in which the vehicle cabin interior information acquisition unit acquires, as the vehicle cabin interior information, an image of a vehicle cabin interior, the image being photographed by a camera provided in the vehicle, and a sound in the vehicle cabin the sound being detected by a microphone provided in the vehicle, and the dirt factor element recognition unit recognizes, as the dirt factor element, a fact that a situation in which an occupant of the vehicle contacts with food and drink in the vehicle cabin is recognized based on the image of the vehicle cabin interior, the image being acquired by the vehicle cabin interior information acquisition unit, and that a concordance rate between the sound in the vehicle cabin, the sound being acquired by the vehicle cabin interior information acquisition unit, and a predetermined monitoring target sound is a third predetermined value or greater.

In the vehicle management system of the seventh item, a situation, in which because the occupant contacts with food and drink and the concordance rate between the sound in the vehicle cabin and the monitoring target sound is the third predetermined value or greater, eating and drinking are presumed to be performed in the vehicle cabin and dirt in the vehicle cabin due to spilled food is likely to occur, may be recognized as the dirt factor element.

(Eighth Item) The vehicle management system according to any one of the first item to the seventh item, in which the vehicle cleaning handling unit transmits the vehicle cleaning information to at least either one of the user terminal and the maintenance management server when use of the vehicle is finished.

In the vehicle management system of the eighth item, the vehicle cleaning information may be prevented from being transmitted to the user terminal or the maintenance management server at an unnecessary timing.

(Ninth Item) The vehicle management system according to any one of the first item to the eighth item, in which the vehicle is a rented vehicle and in which the vehicle management system further includes a first renting fee discounting unit executing a first renting fee discounting process of discounting a renting fee of the vehicle in a case where the dirt factor element recognition unit does not recognize the dirt factor element when the vehicle is returned.

In the vehicle management system of the ninth item, the renting fee of the vehicle is discounted by the first renting fee discounting process, and an incentive to use the vehicle without making the vehicle cabin interior dirty may thereby be given to the user.

(Tenth Item) The vehicle management system according to any one of the first item to the ninth item, in which the vehicle is a rented vehicle and in which the vehicle management system further includes: a vehicle cabin interior cleaning estimation unit estimating that a vehicle cabin interior is cleaned based on the vehicle cabin interior information acquired by the vehicle cabin interior information acquisition unit; and a second renting fee discounting unit executing a second renting fee discounting process of discounting a renting fee of the vehicle in a case where the vehicle cleaning handling unit transmits the vehicle cleaning information to the user terminal when the vehicle is returned and where the vehicle cabin interior cleaning estimation unit estimates that the vehicle cabin interior is cleaned based on the vehicle cabin interior information acquired by the vehicle cabin interior information acquisition unit after transmission of the vehicle cleaning information.

In the vehicle management system of the tenth item, the renting fee of the vehicle is discounted by the second renting fee discounting process, and an incentive to clean the vehicle cabin interior may thereby be given to the user.

(Eleventh Item) The vehicle management system according to the tenth item, further including a vehicle renting management unit prohibiting renting of the vehicle until a predetermined renting prohibited period elapses after the vehicle is returned, in a case where the vehicle cleaning handling unit transmits the vehicle cleaning information to the user terminal when the vehicle is returned and where the vehicle cabin interior cleaning estimation unit does not estimate that the vehicle cabin interior is cleaned.

In the vehicle management system of the eleventh item, satisfaction of the user who used the vehicle may be prevented from being lowered due to the vehicle rented in a state where the vehicle cabin interior is dirty.

(Twelfth Item) A vehicle management method being executed by a vehicle management system, the vehicle management method including: a vehicle cabin interior information acquisition step of acquiring vehicle cabin interior information indicating a situation in a vehicle cabin of a vehicle; a dirt, factor element recognition step of recognizing a dirt factor element based on the vehicle cabin interior information acquired by the vehicle cabin interior, information acquisition step, the dirt factor element being an element serving as a possible factor of dirt in the vehicle cabin; and a vehicle cleaning handling step of transmitting vehicle cleaning information about cleaning of the vehicle to at least either one of a user terminal and a maintenance management server when the dirt factor element is recognized by the dirt factor element recognition step, the user terminal being used by a user of the vehicle, the maintenance management server managing maintenance of the vehicle.

The vehicle management method of the twelfth item is executed by a vehicle management system, and a configuration of the vehicle management system of the first item may thereby be realized.

REFERENCE SIGNS LIST 1 vehicle management system
10 vehicle
20 vehicle control device
21 vehicle cabin interior information acquisition unit
22 dirt factor element recognition unit
23 vehicle position recognition unit
24 vehicle use situation recognition unit
25 weather recognition unit
26 power source state recognition unit
27 vehicle cleaning handling unit
28 vehicle cabin interior cleaning estimation unit
30 memory
43 vehicle cabin camera
44 microphone
45 odor sensor
46 load sensor
47 rain sensor
48 start switch
50 automotive navigation system
60 battery
90 user terminal
100 vehicle renting system
101 vehicle renting management unit
102 first renting fee discounting unit
103 second renting fee discounting unit
110 rented vehicle DB
200 maintenance management server
300 weather information server
U user
K child

What is claimed is:
1. A vehicle management system comprising:
a CPU; a memory; and a microphone that detects a sound in a vehicle cabin, wherein the CPU functions as:
a vehicle cabin interior information acquisition unit acquiring the sound in the vehicle cabin detected by the microphone as vehicle cabin interior information indicating a situation in a vehicle cabin of a vehicle;
a dirt factor element recognition unit recognizing a dirt factor element based on the vehicle cabin interior information acquired by the vehicle cabin interior information acquisition unit, the dirt factor element being an element serving as a possible factor of dirt in the vehicle cabin; and
a vehicle cleaning handling unit transmitting vehicle cleaning information about cleaning of the vehicle to at least either one of a user terminal and a maintenance management server when the dirt factor element recognition unit recognizes the dirt factor element, the user terminal being used by a user of the vehicle, the maintenance management server managing maintenance of the vehicle,
the CPU, by function of the direct factor element recognition unit, recognizes the dirt factor element based on a concordance rate between the sound in the vehicle cabin, the sound being acquired by the vehicle interior information acquisition unit, and a predetermined monitoring target sound that is recorded in the memory in advance,
wherein the vehicle is a rented vehicle, and
wherein the CPU further functions as:
a vehicle cabin interior cleaning estimation unit estimating that a vehicle cabin interior is cleaned based on the vehicle cabin interior information acquired by the vehicle cabin interior information acquisition unit;
a renting fee discounting unit executing a renting fee discounting process of discounting a renting fee of the vehicle in a case where the vehicle cleaning handling unit transmits the vehicle cleaning information to the user terminal when the vehicle is returned and where the vehicle cabin interior cleaning estimation unit estimates that the vehicle cabin interior is cleaned based on the vehicle cabin interior information acquired by the vehicle cabin interior information acquisition unit after transmission of the vehicle cleaning information, and
a vehicle renting management unit prohibiting renting of the vehicle until a predetermined renting prohibited period elapses after the vehicle is returned, in a case where the vehicle cleaning handling unit transmits the vehicle cleaning information to the user terminal when the vehicle is returned and where the vehicle cabin interior cleaning estimation unit does not estimate that the vehicle cabin interior is cleaned.

2. The vehicle management system according to claim 1, further comprising a vehicle cabin camera that acquires an image of a vehicle cabin interior, wherein
the vehicle cabin interior information acquisition unit acquires an image of the vehicle cabin interior, acquired by the vehicle cabin camera, as the vehicle cabin interior information, and
the dirt factor element recognition unit recognizes a situation in which an occupant of the vehicle contacts with food and drink in the vehicle cabin as the dirt factor element based on the image of the vehicle cabin interior, the image being acquired by the vehicle cabin interior information acquisition unit.

3. The vehicle management system according to claim 1, further comprising a vehicle cabin camera that acquires an image of a vehicle cabin interior, wherein
the vehicle cabin interior information acquisition unit acquires an image of the vehicle cabin interior, acquired by the vehicle cabin camera, as the vehicle cabin interior information, and
the dirt factor element recognition unit recognizes a situation in which a child rides in the vehicle cabin as the dirt factor element based on the image of the vehicle cabin interior, the image being acquired by the vehicle cabin interior information acquisition unit.

4. The vehicle management system according to claim 1, further comprising a vehicle cabin camera that acquires an image of a vehicle cabin interior, wherein
the vehicle cabin interior information acquisition unit acquires an image of the vehicle cabin interior, acquired by the vehicle cabin camera, as the vehicle cabin interior information, and
the dirt factor element recognition unit recognizes the dirt factor element based on a concordance rate between the image of the vehicle cabin interior, the image being photographed by the vehicle cabin camera after use of the vehicle is finished and acquired by the vehicle cabin interior information acquisition unit, and a reference image of the vehicle cabin interior that is recorded in the memory in advance.

5. The vehicle management system according to claim 1, further comprising an odor sensor that acquires an odor level in the vehicle cabin, wherein
the vehicle cabin interior information acquisition unit acquires an odor level in the vehicle cabin as the vehicle cabin interior information, that is acquired by the odor sensor, and
the dirt factor element recognition unit recognizes the dirt factor element based on the odor level acquired by the vehicle cabin interior information acquisition unit.

6. The vehicle management system according to claim 2, wherein
the dirt factor element recognition unit recognizes the dirt factor element when a situation in which an occupant of the vehicle contacts with food and drink in the vehicle cabin is recognized based on the image of the vehicle cabin interior, the image being acquired by the vehicle cabin interior information acquisition unit, and that a concordance rate between the sound in the vehicle cabin, the sound being acquired by the vehicle cabin interior information acquisition unit, and the monitoring target sound that is recorded in the memory in advance is a predetermined value or greater.

7. The vehicle management system according to claim 1, wherein
the vehicle cleaning handling unit transmits the vehicle cleaning information to at least either one of the user terminal and the maintenance management server when use of the vehicle is finished.

8. The vehicle management system according to claim 1, wherein the CPU further functions as a first renting fee discounting unit executing a first renting fee discounting process of discounting the renting fee of the vehicle in a case where the dirt factor element recognition unit does not recognize the dirt factor element when the vehicle is returned.

9. The vehicle management system according to claim 1, wherein
the monitoring target sound is a sound that indicates a situation in which dirt in the vehicle cabin highly possibly occurs, and
the dirt factor element recognition unit recognizes the dirt factor element when the concordance rate between the sound in the vehicle cabin, the sound being acquired by the vehicle cabin interior information acquisition unit, and the monitoring target sound that is recoded in the memory in advance is a predetermined value or greater.

10. A vehicle management method being executed by a vehicle management system, the vehicle management method comprising:
a vehicle cabin interior information acquisition step of acquiring a sound in a vehicle cabin that is detected by a microphone which detects the sound in vehicle cabin as vehicle cabin interior information indicating a situation in a vehicle cabin of a vehicle;
a dirt factor element recognition step of recognizing a dirt factor element based on the vehicle cabin interior information acquired by the vehicle cabin interior information acquisition step, the dirt factor element being an element serving as a possible factor of dirt in the vehicle cabin; and
a vehicle cleaning handling step of transmitting vehicle cleaning information about cleaning of the vehicle to at least either one of a user terminal and a maintenance management server when the dirt factor element is recognized by the dirt factor element recognition step, the user terminal being used by a user of the vehicle, the maintenance management server managing maintenance of the vehicle,
wherein in the dirt factor element recognition step, the dirt factor element is recognized based on a concordance rate between the sound in the vehicle cabin, the sound being acquired by the vehicle cabin interior information acquisition unit, and a monitoring target sound that is recoded in the memory in advance,
wherein the vehicle is a rented vehicle, and
wherein the method further comprises:
a vehicle cabin interior cleaning estimation step of estimating that a vehicle cabin interior is cleaned based on the vehicle cabin interior information acquired in the vehicle cabin interior information acquisition step;
a renting fee discounting step of executing a renting fee discounting process of discounting a renting fee of the vehicle in a case where the vehicle cleaning information is transmitted to the user terminal in the vehicle cleaning handling step when the vehicle is returned and where the vehicle cabin interior is estimated as being cleaned in the vehicle cabin interior cleaning estimation step based on the vehicle cabin interior information acquired in the vehicle cabin interior information acquisition step after transmission of the vehicle cleaning information, and a vehicle renting management step of prohibiting renting of the vehicle until a predetermined renting prohibited period elapses after the vehicle is returned, in a case where the vehicle cleaning information is transmitted to the user terminal in the vehicle cleaning handling step when the vehicle is returned and where the vehicle cabin interior is not estimated as being cleaned in the vehicle cabin interior cleaning estimation step.

\* \* \* \* \*